Jan. 29, 1924.
L. W. TIMBERLAKE
MUD LUG FOR WHEELS
Filed Oct. 21, 1922
1,482,050
2 Sheets-Sheet 1
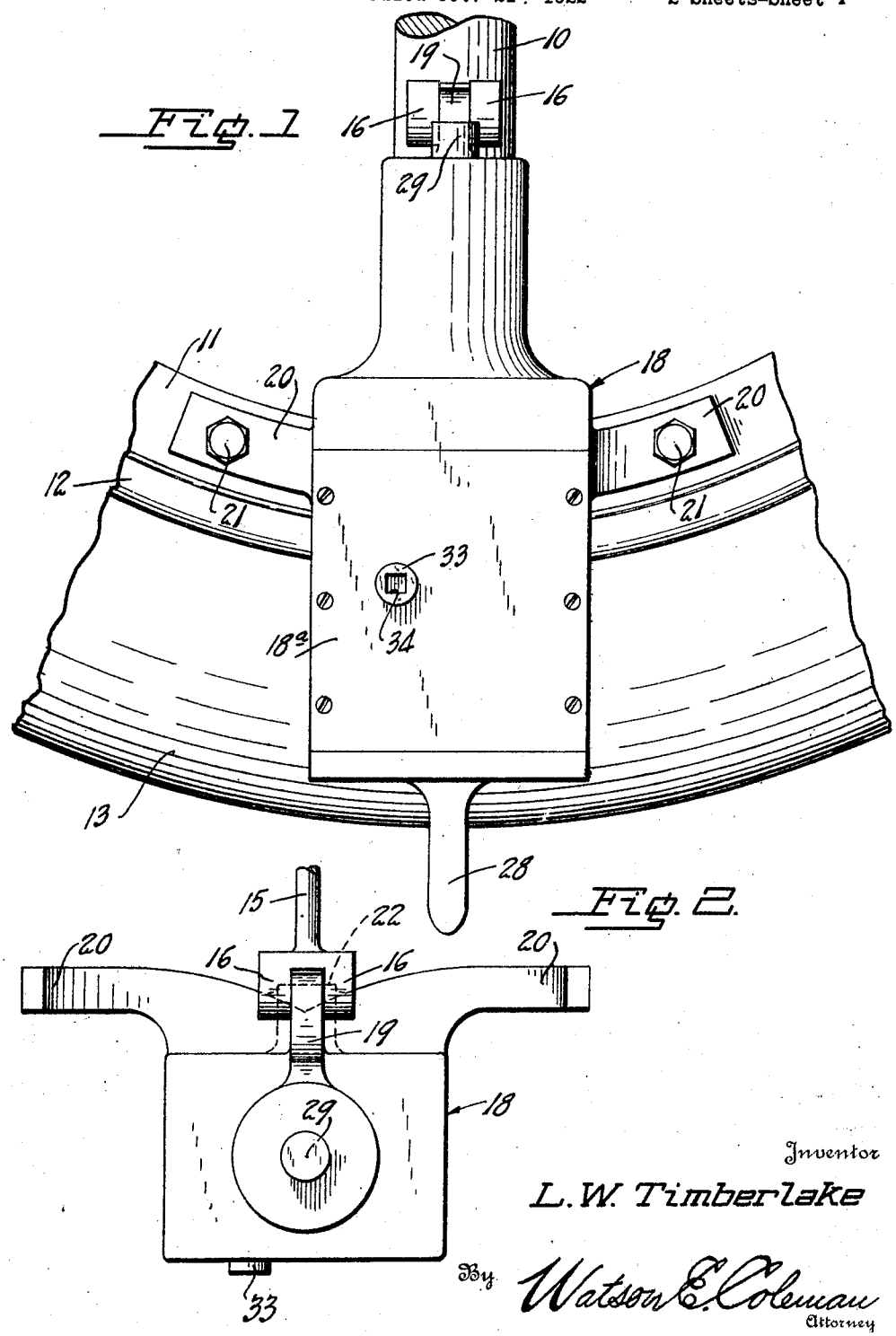
Inventor
L. W. Timberlake
By Watson E. Coleman
Attorney Jan. 29, 1924.  
L. W. TIMBERLAKE  
MUD LUG FOR WHEELS  
Filed Oct. 21, 1922  
1,482,050  
2 Sheets-Sheet 2
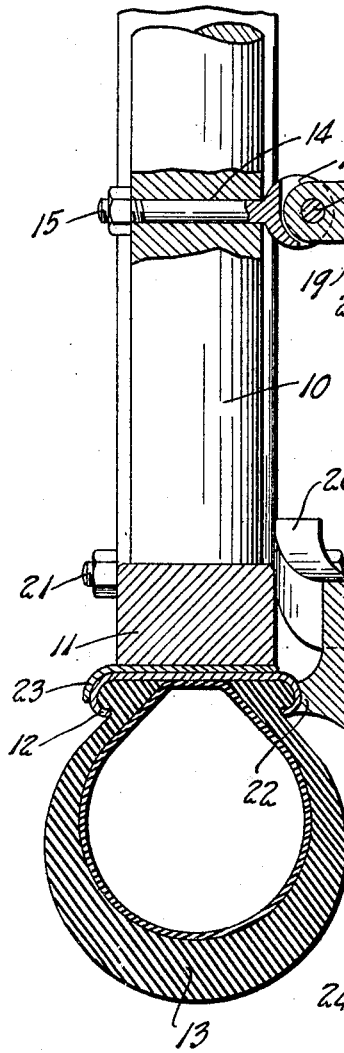
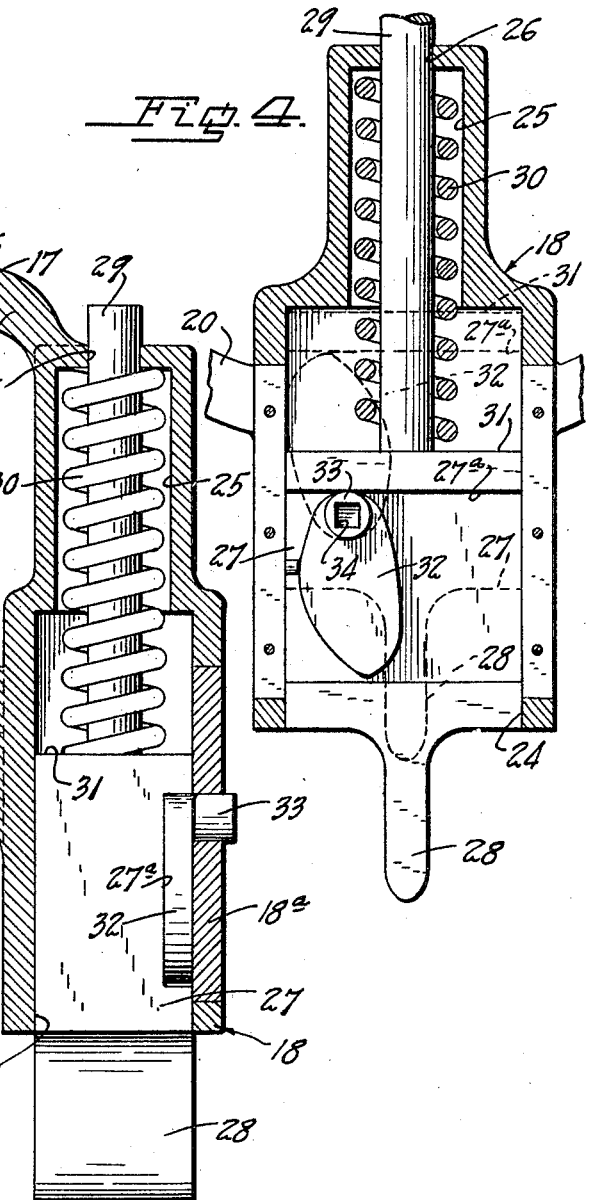
Inventor  
L.W. Timberlake  
By Watson E. Coleman  
Attorney Patented Jan. 29, 1924.

1,482,050

UNITED STATES PATENT OFFICE.

LEONARD W. TIMBERLAKE, OF OSKALOOSA, IOWA.

MUD LUG FOR WHEELS.

Application filed October 21, 1922. Serial No. 596,010.

*To all whom it may concern:*

Be it known that I, LEONARD W. TIMBERLAKE, a citizen of the United States, residing at Oskaloosa, in the county of Mahaska and State of Iowa, have invented certain new and useful Improvements in Mud Lugs for Wheels, of which the following is a specification, reference being had to the accompanying drawings.

This invention relates to improvements in mud lugs for vehicles, and an important object of the invention is to provide a mud lug for use in conjunction with vehicles having pneumatic tires, and more particularly to that class of vehicles wherein the tires are mounted upon demountable rims, the construction of the mud lug being such that when in position it maintains the removable rim in position upon the felly of the wheel, thereby eliminating the necessity of the ordinary rim retaining lugs.

A further object of the invention is to provide a device of this character which may be shifted to permit removal of the tire without the necessity of completely removing the mud lug from the wheel.

A still further object of the invention is to provide a device of this character wherein the lug proper is withdrawable to a point where it does not engage with the ground when the vehicle is passing over hard surfaces, thereby eliminating the necessity of either removing the lugs in passing over this hard ground or being subjected to the jarring accompanying the operation of a vehicle equipped with mud lugs in passing over such surfaces.

Another object of the invention is to provide means for the mounting of the mud lug proper whereby the lug is yieldably mounted and may automatically withdraw when it comes into contact with a hard surface to cushion and partially eliminate the shock occasioned by such contact.

An additional object of the invention is to provide a device of this character which is simple in its construction, may be readily operated, is durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:

Figure 1 is a side elevation of a mud lug constructed in accordance with my invention showing the same applied to a vehicle wheel;

Figure 2 is a plan view thereof detached;

Figure 3 is a vertical sectional view taken through a mud lug applied to the vehicle, the plunger being shown in elevation; and Figure 4 is a transverse vertical sectional view, parts being shown in elevation, showing the operation of the controlling cam.

Referring now more particularly to the drawings, the numeral 10 designates a spoke of the wheel, 11 the felly thereof and 12 a removable rim adapted for the reception of a pneumatic tire 13 for the wheel. Formed in certain of the spokes 10 of the wheel at points spaced circumferentially of the wheel are openings 14 in which are disposed bolts 15 which are removable and which are provided at one end with spaced ears 16 in which is mounted a pivot pin 17.

The numeral 18 designates a casting having at its upper end a lug 19 adapted to extend between the ears 16 and having an opening formed therein for the reception of the pivot pin 17. Adjacent its lower end the casting is provided with oppositely extending flanges 20 having openings formed therein adapted for the reception of securing elements 21 adapted to extend through the flanges and through the felly 11 and secure the casting firmly to the felly. When the casting is secured in this position, a portion thereof, as indicated at 22, engages against the rim 12 to prevent transverse movement of the rim upon the felly, it being understood that the movement of the rim in the opposite direction is prevented by means of the usual coacting lugs formed upon the rim and felly, as indicated at 23. It will be seen that by simply removing the securing elements 21, which may be of any desired type, the casting 18 may be revolved upon its pivot with the ears 16 and swung out of position so that the rim 12 may be removed for the replacement of the tire 13 whenever desired.

The casting 18 has formed therein and opening through the bottom thereof a bore 24 substantially rectangular in cross section, the upper end of the bore being reduced, as indicated at 25, and extending into proximity to the upper end of the casting. Through the upper end of the casting is formed an opening 26 communicating with the upper end of the reduced portion 25 of the bore. Disposed within the bore is a plunger 27 having a sliding fit in the enlarged portion of the bore and provided at its lower end with a traction blade 28. The upper end of the plunger 27 is reduced, as indicated at 29, and extends through the reduced bore 25 and the opening 26 in the upper wall of the casting. Within the reduced bore 25 is disposed a compression spring 30, the upper end of which abuts the upper end of the reduced bore 25 and the lower end of which engages against the shoulder 31 formed by the reduction of the plunger 27. It will be seen that the plunger 27 is normally forced downwardly so that the blade 28 thereof projects for engagement with the ground but that upon engagement of this blade with any hard substance, such as a stone concealed within the mud or with hard ground, the spring 30 will yield, permitting the plunger to move upwardly within the casing until the blade 28 is withdrawn, thereby preventing breakage of the blade and cushioning the shock which would otherwise be occasioned.

In order that the blade 28 may be withdrawn when not in use and that the movement of the plunger 27 within the bore 24 may be limited, I construct the outer wall of the casting 18 in the form of a removable plate 18ª. The adjacent face of the plunger 27 is provided with a recess 27ª, and upon the inner face of the plate 18ª is mounted a cam 32. This cam engages the upper wall of the recess 27ª and limits the downward movement of the plunger within the bore. The cam is provided with a stem 33 rotatably mounted in an opening formed in the plate 18ª, the stem being adapted at its outer end, as by means of a socket 34, for the reception of a wrench by means of which the cam may be rotated. This cam is of such construction that upon rotation thereof the blade 28 may be completely withdrawn against the action of the spring 30 and concealed within the casting 18 when not in use. When in this position, the high point of the cam is slightly off centered, as indicated in dotted lines in Figure 4 and the cam is in engagement with the wall of the casting 18, as shown in this figure, so that the pressure exerted by the spring 30 tends to force the cam more firmly into engagement with the wall of the casting and the cam is accordingly locked against movement.

From the foregoing it is believed to be obvious that by the use of a mud lug constructed in accordance with my invention, the necessity for the use of rim lugs for the vehicle tire rim is eliminated, and at the same time a structure provided whereby the securing means for the rim may be readily removed to permit a change of tires. It will be noted that the construction shown is extremely rugged and one which does not readily lend itself to breakage, the yieldability of the blade 28 and the means for withdrawing the same forming important features of the construction. The details of construction of the device being capable of considerable change and modification without materially departing from the spirit of my invention, I do not limit myself thereto except as hereinafter claimed.

I claim:—

1. The combination with a vehicle wheel embodying a removable tire rim, mud lugs pivoted to circumferentially spaced spokes of the wheel and having securing elements engaging the felly of the wheel, normally preventing pivotal movement thereof, said lugs embodying portions engaging said rim to prevent removal thereof.

2. In combination with a vehicle wheel embodying a removable tire rim, of a member secured to a spoke of the wheel, a mud lug pivoted to said member and embodying a casing having means whereby it may be rigidly secured to the felly of the wheel, a portion of said casing engaging the tire rim when the casing is secured to the felly of the wheel to maintain said rim in position.

3. In combination with a vehicle wheel having a removable tire rim, castings permanently and pivotally connected to the vehicle wheel, removable securing means engaging the wheel for preventing rotation of the castings about the pivots thereof, said castings having portions engaging said tire rim when the device is in operative position for preventing removal of said tire rim, a plunger within said casting embodying a ground engaging blade extensible from and withdrawable within the casing and means for locking said blade in withdrawn position.

4. In combination with a wheel having a demountable rim, members pivoted to the wheel and embodying portions engaging the rim in one position to prevent removal of the rim, means for securing the members in such position, and plungers carried by the members and extensible therefrom to engage with the ground.

5. In a mud lug, a casing adapted for attachment to a vehicle wheel, a spring pressed plunger carried by the casing and having a blade normally extended for engagement with the ground, said blade being completely withdrawable within the casing, and means for withdrawing the plunger, locking the same in withdrawn position, and limiting the movement of the plunger under the influence of its spring, comprising a cam mounted within the casing and in a slot formed in the side wall of the plunger, and a pivot for said cam extending through the wall of the casing and adapted at its outer end for engagement with means for rotating the cam, said cam when in one position positively locking said plunger against downward movement.

In testimony whereof I hereunto affix my signature.

LEONARD W. TIMBERLAKE.